(12) United States Patent
Shono (10) Patent No.: US 6,972,711 B2
(45) Date of Patent: Dec. 6, 2005

(54) TRANSMIT-RECEIVE FM-CW RADAR APPARATUS

(75) Inventor: Masayoshi Shono, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 29 days.

(21) Appl. No.: 10/804,390

(22) Filed: Mar. 18, 2004

(65) Prior Publication Data

US 2004/0189513 A1    Sep. 30, 2004

(30) Foreign Application Priority Data

Mar. 25, 2003    (JP)   ............................ 2003-083083

(51) Int. Cl.$^7$ ................................................ G01S 7/34
(52) U.S. Cl. ....................... 342/92; 342/100; 342/70
(58) Field of Search .......................... 342/70–72, 89, 342/91–95, 100

(56) References Cited

U.S. PATENT DOCUMENTS

| | | | |
|---|---|---|---|
| 4,276,549 A * | 6/1981 | Tomasi ........................ 342/87 |
| 5,247,306 A | 9/1993 | Hardange et al. | |
| 5,281,925 A * | 1/1994 | Hulick ........................ 330/296 |
| 5,285,207 A * | 2/1994 | Asbury et al. ............... 342/129 |
| 5,432,473 A * | 7/1995 | Mattila et al. ............... 330/133 |
| 5,493,255 A * | 2/1996 | Murtojarvi ................... 330/296 |
| 5,767,793 A | 6/1998 | Agravante et al. | |
| 6,031,483 A | 2/2000 | Urabe et al. | |
| 6,040,898 A * | 3/2000 | Mrosik et al. .............. 365/5.09 |
| 6,720,912 B2 * | 4/2004 | Shono ........................ 342/198 |
| 2002/0180635 A1 * | 12/2002 | Shono ........................ 342/198 |

FOREIGN PATENT DOCUMENTS

| | | |
|---|---|---|
| JP | 8-301029 | 11/1996 |
| JP | 2001-215272 | 8/2001 |
| JP | 2002-122661 | 4/2002 |
| JP | 2002-189074 | 7/2002 |

OTHER PUBLICATIONS

"IF amplifier module for high-sweep speed LFMCW radar", Liwan Liang; Yang Li; Weifeng Pang; Zhenhe Feng; Microwave and Millimeter Wave Technology, 2000, 2nd International Conference on. ICMMT 2000 Sep. 14-16, 2000 P(s):662-665.*
Patent Abstract of Japan 2002189074 A, Published Jul. 5, 2002, in the name of Kawakubo.
European Patent Office Patent Abstracts of Japan, Publication No. 2001215272; Publication Date Aug. 10, 2001; Inventor: Yamawaki Toshiki.
European Search Report, dated Jul. 15, 2004, for Application No. 04251641.9, Fujitsu Ten Limited.

* cited by examiner

*Primary Examiner*—John B. Sotomayor
(74) *Attorney, Agent, or Firm*—Christie, Parker and Hale, LLP (57) ABSTRACT

Disclosed is a transmit-receive FM-CW radar apparatus which switches between transmission and reception by time division control, wherein amplifiers capable of controlling gain are provided in a transmitter signal path and a receiver signal path, respectively, and wherein the gain in the leading edge portion of a receive timing interval or the gain in the trailing edge portion of a transmit timing interval is suppressed by controlling the gain of the amplifier provided in the receiver signal path or the gain of the amplifier provided in the transmitter signal path, respectively.

10 Claims, 11 Drawing Sheets

TRANSMIT TIMING INTERVAL

Fig.4B

RETURN TIMING OF REFLECTED WAVE

Fig.4C

RECEIVE TIMING INTERVAL

Fig.4D

ACTUALLY RECEIVED REFLECTED WAVE

Fig.5A RETURN TIMING OF REFLECTED WAVE FROM SHORT-RANGE TARGET

Fig.5B RETURN TIMING OF REFLECTED WAVE FROM MID-RANGE TARGET

Fig.5C RETURN TIMING OF REFLECTED WAVE FROM LONG-RANGE TARGET

Fig.5D RECEIVE TIMING INTERVAL

Fig.11A TRANSMIT TIMING INTERVAL

Fig.11B RETURN TIMING OF REFLECTED WAVE

Fig.11C RECEIVE TIMING INTERVAL

Fig.11D RECEIVED REFLECTED WAVE

TRANSMIT-RECEIVE FM-CW RADAR APPARATUS

Applicant claims the right to priority from, and incorporates by reference the entire disclosure of, Japanese Patent Application No. 2003-83083 which was filed Mar. 25, 2003.

BACKGROUND OF THE INVENTION

1. Field of the Invention

The present invention relates to an FM-CW radar apparatus that uses a frequency-modulated (FM) continuous wave (CW) transmit signal and, more particularly, to a transmit-receive FM-CW radar apparatus that uses a single antenna and switches the antenna between transmission and reception by time division.

2. Description of the Related Art

FM-CW radar is used as a radar system for measuring the distance, the relative velocity, etc. of a target object. As FM-CW radar can measure the distance and the relative velocity of a vehicle traveling ahead by using a simple signal processing circuit, and as its transmitter and receiver can be constructed with simple circuitry, this type of radar is used as an automotive collision avoidance radar.

It is known to provide a single-antenna time division control-type FM-CW radar that uses a single antenna for both transmission and reception. For example, there is disclosed a radar system in which amplifiers are provided in the transmitter and receiver signal paths, respectively, and switching between transmission and reception is performed by operating the transmitter amplifier and the receiver amplifier, in an alternating fashion, in synchronism with the transmit and receive timings (refer to Japanese Unexamined Patent Publication No. 2002-122661).

The switching between transmission and reception is performed by controlling the gains of the amplifiers and turning the amplifiers on and off. By controlling the gains of the amplifiers and turning the amplifiers on and off for switching between transmission and reception, the isolation between the transmitter and the receiver is increased to prevent the transmitter power from leaking via a transmit-receive switch to the receiving system.

SUMMARY OF THE INVENTION

In FM-CW radar, as the power of the received signal decreases with the fourth power of the distance to the target, the level of the received power greatly differs between the waves reflected from a short-range target and the waves reflected from a long-range target. As a result, a wide dynamic range is required of the receiver circuit, which leads to an increase in the cost of the receiver circuit.

It is an object of the present invention to provide a transmit-receive FM-CW radar that can properly detect targets and can properly process received signals according to the ranges of the targets, while achieving increased isolation between the transmitter and the receiver but without requiring an increase in the dynamic range of the receiver circuit.

In a transmit-receive FM-CW radar apparatus according to the present invention, an amplifier capable of controlling gain is provided in a transmitter signal path or a receiver signal path and, by using an amplifier gain controller, the amplifier provided in the receiver signal path is controlled so as to suppress the gain in the first half of a receive timing interval or the amplifier provided in the transmitter signal path is controlled so as to suppress the gain in the second half of a transmit timing interval; with this configuration, the dynamic range of the receiving system can be reduced.

In one preferred mode of the invention, amplifiers are provided in both the transmitter and the receiver, and the switching between transmission and reception is performed by operating the amplifier provided in the transmitter and the amplifier provided in the receiver in an alternating fashion in synchronism with the transmit and receive timings.

The gain is controlled in such a manner as to reduce the amount of suppression gradually from the leading edge toward the midpoint of the receive timing interval or from the trailing edge toward the midpoint of the transmit timing interval, thereby suppressing the received power of the reflected wave from a short-range target. Alternatively, the gain may be controlled in such a manner as to reduce the amount of suppression stepwise from the leading edge toward the midpoint of the receive timing interval or from the trailing edge toward the midpoint of the transmit timing interval.

In another preferred mode of the invention, a plurality of amplifiers are provided in the receiver signal path, and one of the amplifiers is used for performing the switching between transmission and reception, while the other one of the amplifiers is used for suppressing the gain in the first half of the receive timing interval.

The suppression of the gain or the switching between transmission and reception by the amplifier is performed by varying a voltage applied to the amplifier.

In a further preferred mode of the invention, a multiplier capable of controlling power is provided in the transmitter signal path or in a branch section, branching off a directional coupler, in the transmitter and, by using a power controller provided for the multiplier, a voltage applied to the multiplier (Mt) provided in the transmitter signal path is varied so as to suppress power in the second half of the transmit timing interval or a voltage applied to the multiplier (Mr) provided in the branch section is varied so as to suppress power in the first half of the receive timing interval.

According to the transmit-receive FM-CW radar of the present invention, by suppressing the power of the reflected wave, particularly from a short-range target, the dynamic range of the receiving system for receiving waves reflected from targets, not only at short range but also at long range, can be reduced.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the radar apparatus of the present invention, the principle of FM-CW radar will be described.

An FM-CW radar measures the distance to a target object, such as a vehicle traveling ahead, by transmitting a continuous wave frequency-modulated, for example, in a triangular pattern. More specifically, the transmitted wave from the radar is reflected by the vehicle ahead, and the reflected signal is received and mixed with the transmitted signal to produce a beat signal (radar signal). This beat signal is fast Fourier transformed to analyze the frequency. The frequency-analyzed beat signal exhibits a peak at which power becomes large in correspondence with the target. The frequency corresponding to this peak is called the peak frequency. The peak frequency carries information about distance, and the peak frequency differs between the rising portion and falling portion of the triangular FM-CW wave due to the Doppler effect associated with the relative velocity with respect to the vehicle ahead. The distance and the relative velocity with respect to the vehicle ahead can be obtained from the peak frequencies in the rising and falling portions. If there is more than one vehicle traveling ahead, a pair of peak frequencies, one in each rising and falling portion, is generated for each vehicle. Forming pairs of peak frequencies in the rising and falling portions is called pairing.

Figure 1A:
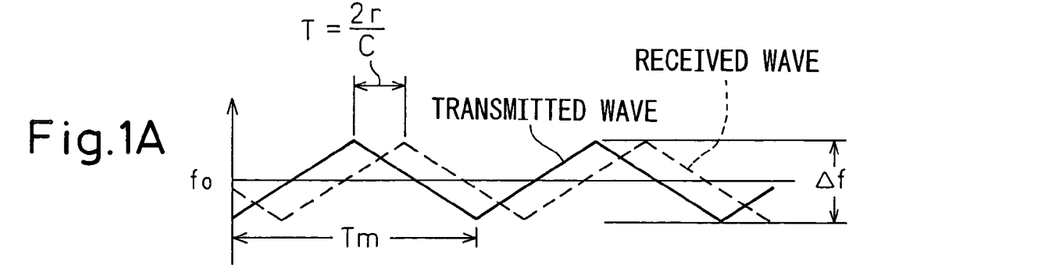
FIGS. 1A, 1B, and 1C are diagrams for explaining the principle of FM-CW radar when the relative velocity with respect to a target is 0.
Figure 1B:
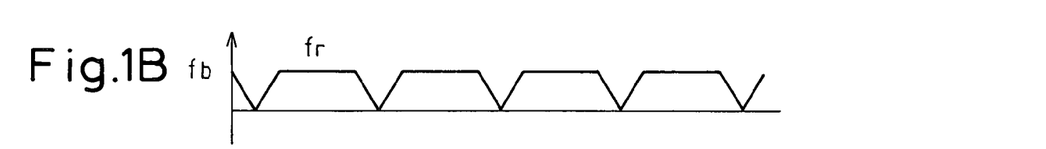
Figure 1C:
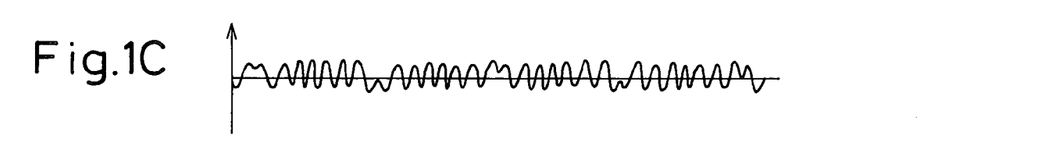

FIGS. 1A to 1C are diagrams for explaining the principle of the FM-CW radar when the relative velocity with respect to the target is 0. The transmitted wave is a triangular wave whose frequency changes as shown by a solid line in FIG. 1A. In the figure, f0 is the center frequency of the transmitted wave, Δf is the FM modulation width, and Tm is the repetition period. The transmitted wave is reflected from the target and received by an antenna; the received wave is shown by a dashed line in FIG. 1A. The round trip time T, to and from the target, is given by T=2r/C, where r is the distance (range) to the target and C is the velocity of radio wave propagation.

Here, the received wave is shifted in frequency from the transmitted signal (i.e., produces a beat) according to the distance between the radar and the target.

The frequency component fb of the beat signal can be expressed by the following equation.

$$fb = fr = (4 \cdot \Delta f / C \cdot Tm) r \quad (1)$$

where fr is the frequency due to the range (distance).

Figure 2A:
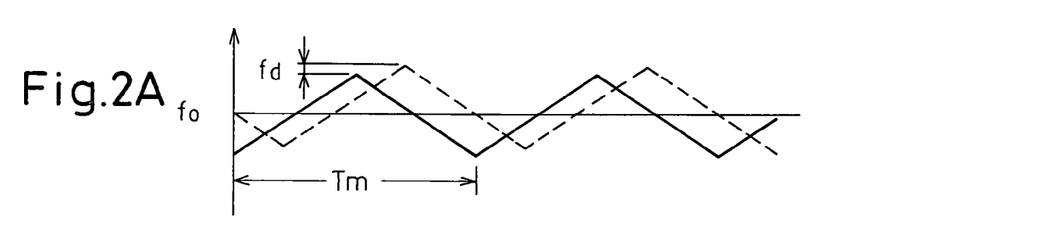
FIGS. 2A, 2B, and 2C are diagrams for explaining the principle of FM-CW radar when the relative velocity with respect to a target is v.
Figure 2B:
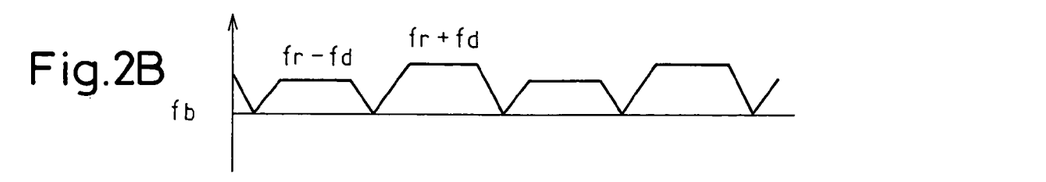
Figure 2C:
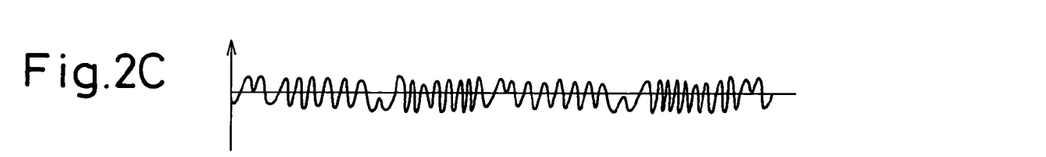

FIGS. 2A to 2C, on the other hand, are diagrams for explaining the principle of the FM-CW radar when the relative velocity with respect to the target is v. The frequency of the transmitted wave changes as shown by a solid line in FIG. 2A. The transmitted wave is reflected from the target and received by the antenna; the received wave is shown by a dashed line in FIG. 2A. Here, the received wave is shifted in frequency from the transmitted signal (i.e., produces a beat) according to the distance between the radar and the target.

In this case, as the relative velocity with respect to the target is v, a Doppler shift occurs, and the beat frequency component fb can be expressed by the following equation.

$$fb = fr \pm fd = (4 \cdot \Delta f / C \cdot Tm) r \pm (2 \cdot f0/C) v \quad (2)$$

where fr is the frequency due to the distance, and fd is the frequency due to the velocity.

Figure 3:
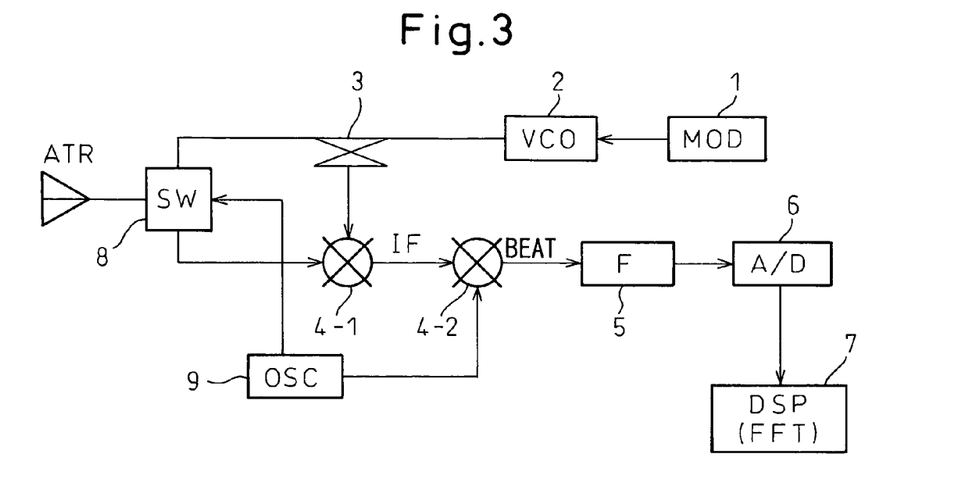
FIG. 3 is a diagram showing one configuration example of a single-antenna transmit-receive FM-CW radar.

The symbols in the above equation have the following meanings.

fb: Transmit beat frequency
fr: Range (distance) frequency
fd: Velocity frequency
f0: Center frequency of transmitted wave
Δf: Frequency modulation width
Tm: Period of modulation wave
C: Velocity of light (velocity of radio waves)
T: Round trip time of radio wave to and from target object
r: Range (distance) to target object
v: Relative velocity with respect to target object FIG. 3 is a diagram showing one configuration example of a single-antenna transmit-receive FM-CW radar. As shown, a modulating signal generator (MOD) 1 applies a modulating signal to a voltage-controlled oscillator (VCO) 2 for frequency modulation, and the frequency-modulated wave is passed through a directional coupler 3 and transmitted out from a transmitting/receiving antenna (ATR), while a portion of the transmitted signal is separated by the directional coupler 3 and fed into a first mixer 4-1. The signal reflected from a target is received by the transmitting/receiving antenna (ART). SW8 is a transmit-receive switch which switches the antenna between transmission and reception in accordance with a signal supplied from a transmit-receive switching signal generator (OSC) 9 constructed from an oscillator. The OSC 9 generates a modulating signal of frequency $f_{SW}$ for causing the SW 8 to switch the antenna between transmission and reception. The received signal is mixed in the first mixer 4-1 with the output signal of the voltage-controlled oscillator (VCO) 2 to produce an IF signal. The IF signal is mixed in a second mixer 4-2 with the modulating signal of frequency $f_{SW}$ supplied from the OSC 9 and is thus downconverted, producing a beat signal. The beat signal is passed through a filter (F) 5, and is converted by an A/D converter (A/D) 6 into a digital signal; the digital signal is then supplied to a digital signal processor (DSP) 7 where signal processing such as a fast Fourier transform is applied to the digital signal to obtain distance, relative velocity, etc.

The power of the received signal received via the transmitting/receiving antenna and the power of the beat signal are as shown below. First, the power of the received signal, Pr, is expressed by the following equation.

$$Pr = \{(G^2 \cdot \lambda^2 \cdot \sigma \cdot Pt)/((4\pi)^3 \cdot r^4)\} \cdot La \qquad (3)$$

The symbols in the above equation have the following meanings.

G: Antenna gain
λ: Wavelength
σ: Cross-sectional area of reflecting object
Pt: Transmitter power
r: Range
La: Atmospheric attenuation factor The power of the beat signal, Pb, is expressed by the following equation.

$$Pb = Pr \cdot Cmix \qquad (4)$$

where Cmix is the conversion loss factor in the mixer.

Figure 4A:
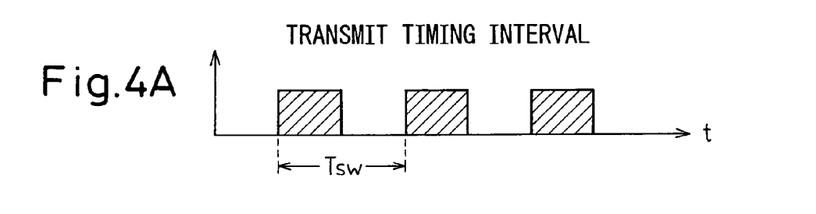
FIGS. 4A, 4B, 4C, and 4D are diagrams showing timings for transmission, reception, etc.
Figure 4B:
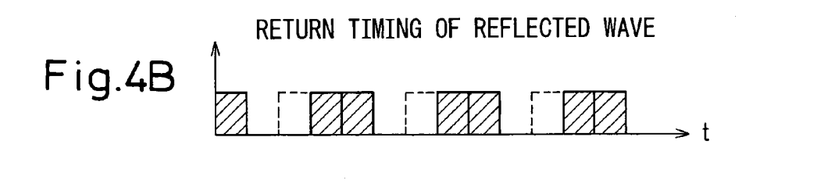
Figure 4C:
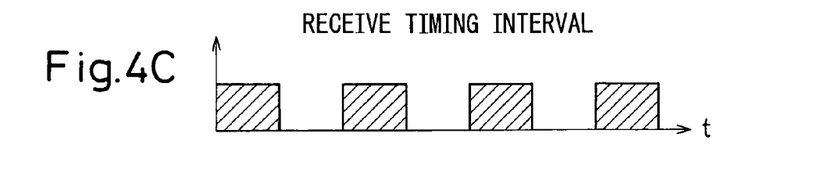
Figure 4D:
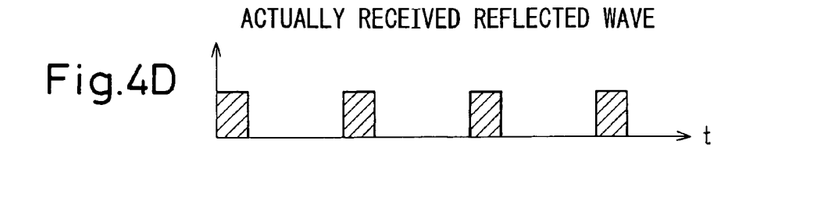

FIGS. 4A to 4D are diagrams showing timings for transmission, reception, etc. The SW 8 in FIG. 3 is switched by the signal of frequency $f_{SW}$ (period $T_{SW}$) to switch the timing between transmission and reception. FIG. 4A shows the transmit timing interval, and FIG. 4B shows the return timing of the transmitted wave reflected from a target. FIG. 4C shows the receive timing interval; the reflected wave returned during this interval is received by the antenna ATR. Accordingly, when the reflected wave is returned at the timing shown in FIG. 4B, the actually received reflected wave is as shown in FIG. 4D.

As described above, in the single-antenna transmit-receive FM-CW radar, the transmit and receive timings are provided one alternating with the other, and the reflected wave, i.e., the transmitted wave returned by reflection from the target, is received. Further, as the receive timing interval is one half the cycle period $T_{SW}$ of the transmit-receive switching frequency, the receiving efficiency is maximized when the delay time of the reflected wave is one half the cycle period; on the other hand, if the delay time is one cycle period, the reflected wave cannot be received.

Accordingly, to secure the desired detection range, the transmit-receive switching frequency must be selected so that the delay time of the reflected wave returned from the desired detection range will be less than one cycle period of the transmit-receive switching frequency.

FIGS. 5A to 5D are diagrams showing which portion of the reflected wave is received according to the target range.

Figure 5A:
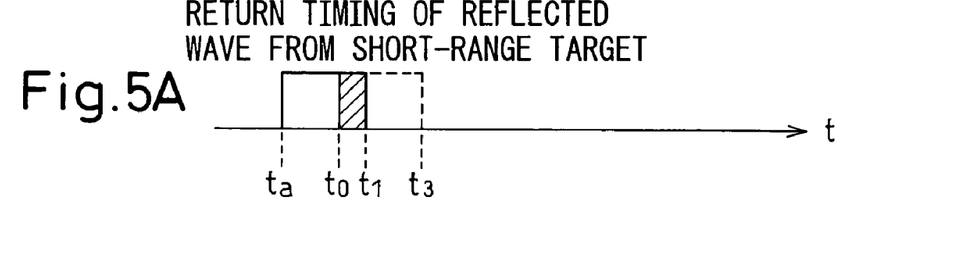
FIGS. 5A, 5B, 5C, and 5D are diagrams showing which portion of a reflected wave is received according to target range.
Figure 5B:
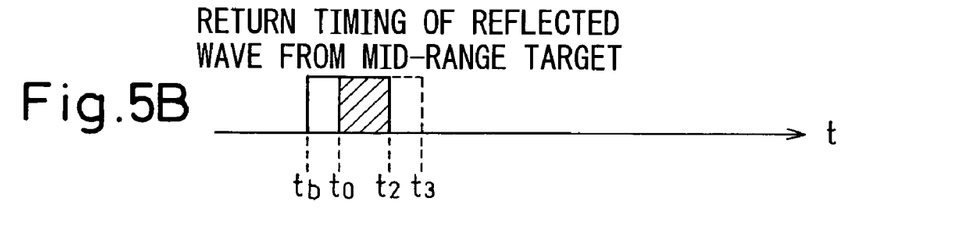
Figure 5C:
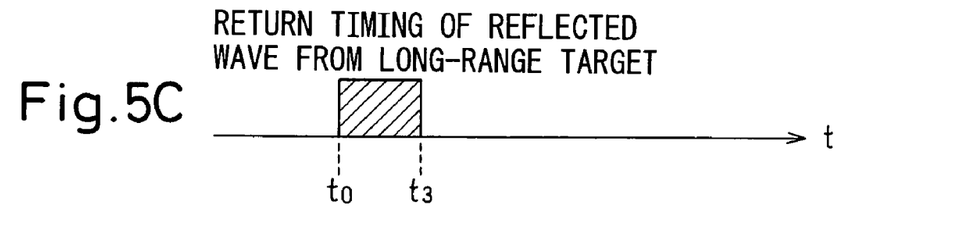
Figure 5D:
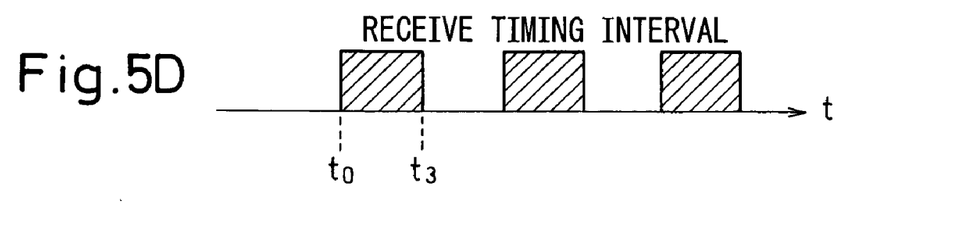

FIG. 5D is a diagram showing the receive timing interval (the same as that shown in FIG. 4C), and FIG. 5A is a diagram showing the return timing, of the reflected wave, from a short-range target. As can be seen from the waveform shown in FIG. 5A, the reflected wave from the short-range target returns during the interval $t_a$ to $t_1$ which is earlier than the receive timing interval $t_0$ to $t_3$. Here, as a portion (from $t_a$ to $t_0$) of the reflected wave returns earlier than the receive timing interval ($t_0$ to $t_3$), this portion is not received and, of the waves reflected from the short-range target, only the portion $t_0$ to $t_1$ is actually received.

Likewise, FIG. 5B is a diagram showing the return timing of the reflected wave from a mid-range target. In this case, as can be seen from the waveform shown in FIG. 5B, as the reflected wave returns during the interval $t_b$ to $t_2$ which is earlier than the receive timing interval, only the portion $t_0$ to $t_2$ is actually received.

FIG. 5C is a diagram showing the return timing of the reflected wave from a long-range target. In this case, as the reflected wave returns during an interval that substantially coincides with the receive timing interval, most of the reflected wave is received.

[Embodiment 1]

Figure 6:
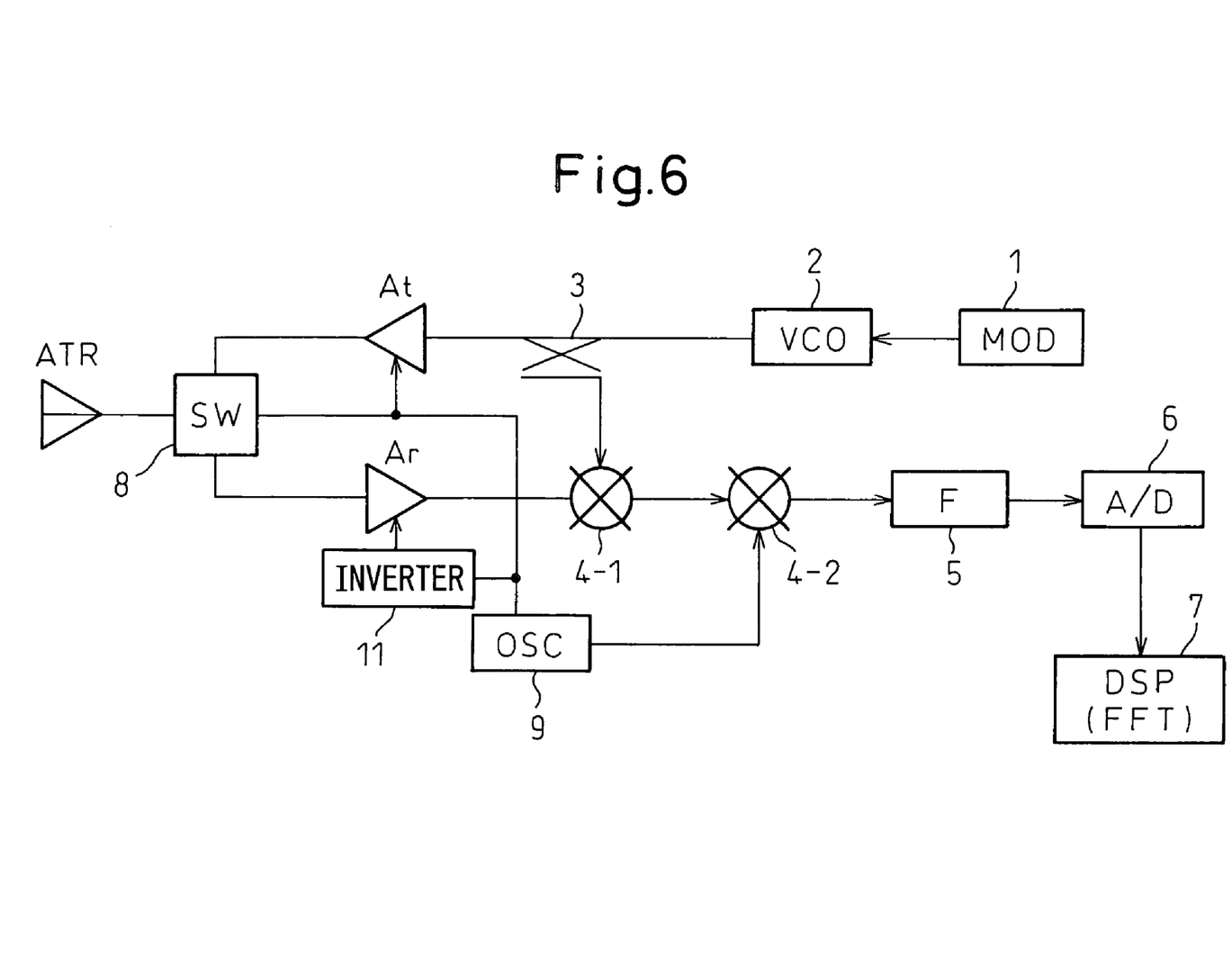
FIG. 6 is a diagram showing one configuration example of a single-antenna transmit-receive FM-CW radar used in the present invention.

FIG. 6 is a diagram schematically showing the configuration of a single-antenna transmit-receive FM-CW radar used in the present invention. A modulating signal generator (MOD) 1 applies a modulating signal to a voltage-controlled oscillator (VCO) 2 for frequency modulation, and the frequency-modulated wave is passed through a directional coupler 3 and transmitted out from a transmitting/receiving antenna (ATR), while a portion of the transmitted signal is separated by the directional coupler 3 and fed into a first mixer 4-1. The signal reflected from a target is received by the transmitting/receiving antenna (ART). SW8 is a transmit-receive switch which switches the antenna between transmission and reception in accordance with a switching signal of frequency $f_{SW}$ supplied from a transmit-receive switching signal generator (OSC) 9 constructed from an oscillator. "At" designates an amplifier provided in the transmitter, and "Ar" an amplifier provided in the receiver; the on/off operations of the amplifiers are controlled by the switching signal of frequency $f_{SW}$ supplied from the transmit-receive switching signal generator (OSC) 9 constructed from an oscillator. The receiver amplifier Ar is provided with an inverter so that the amplifiers At and Ar are alternately turned on and off; that is, transmission is performed when the amplifier At is on, and reception is performed when the amplifier Ar is on.

The received signal is mixed in the first mixer 4-1 with the output signal of the voltage-controlled oscillator (VCO) 2 to produce an IF signal. The IF signal is mixed in a second mixer 4-2 with the modulating signal of frequency $f_{SW}$ supplied from the OSC 9 and is thus downconverted, producing a beat signal. The beat signal is passed through a filter (F) 5, and is converted by an A/D converter (A/D) 6 into a digital signal; the digital signal is then supplied to a digital signal processor (DSP) 7 where signal processing such as a fast Fourier transform is applied to the digital signal to obtain distance, relative velocity, etc.

Figure 7A:
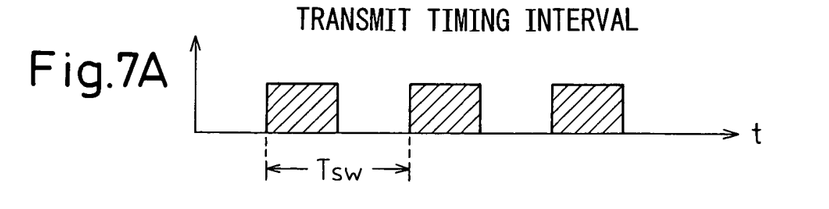
FIGS. 7A, 7B, 7C, 7D, 7E, and 7F are diagrams for explaining the operation of an embodiment of the present invention.
Figure 7B:
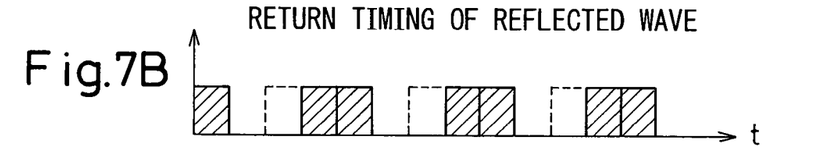
Figure 7C:
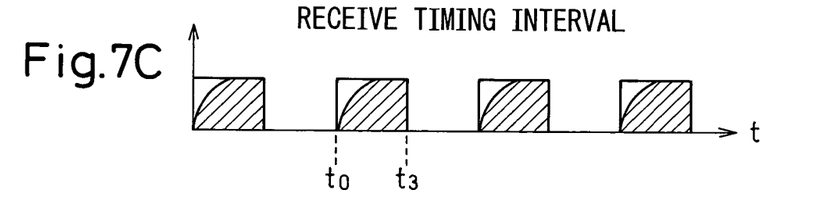

FIGS. 7A to 7F are diagrams for explaining the operation of an embodiment according to the present invention. FIG. 7A shows the transmit timing interval, and FIG. 7B shows the return timing of the reflected wave which is received, with a finite time delay, after the transmit timing. FIG. 7C shows the receive timing interval. In the present invention, the gain of the receiver amplifier Ar in FIG. 6 is controlled. In this case, as shown by oblique hatching in FIG. 7C, the gain is suppressed in the leading edge portion of the receive timing interval, and the amount of suppression is gradually reduced in such a manner that, at a certain point in the interval, for example, at the midpoint, the gain returns to the normal level.

Figure 7D:
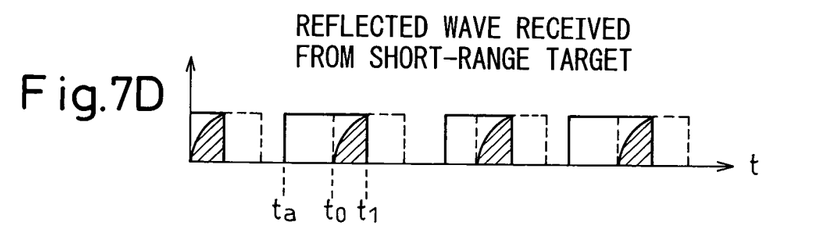

FIG. 7D is a diagram showing the reflected wave received when the target is at a short range. In this case, as the reflected wave returns relatively early, the actually received portion of the reflected wave is only the portion $t_0$ to $t_1$ that falls within the receive timing interval $t_0$ to $t_3$. On the other hand, in the present invention, as the gain of the receiver amplifier Ar is suppressed gradually from the leading edge toward the midpoint of the receive timing interval, as shown in FIG. 7C, the power of the received wave can be suppressed as shown in FIG. 7D.

Figure 7E:
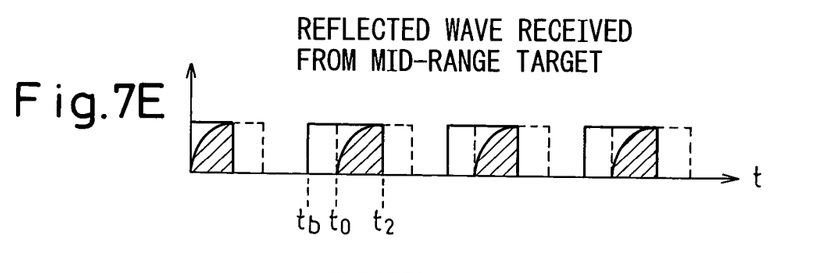

FIG. 7E is a diagram showing the reflected wave received when the target is at mid range. In this case, the actually received portion of the reflected wave is only the portion $t_0$ to $t_2$ that falls within the receive timing interval $t_0$ to $t_3$. In this case also, the power of the received wave can be suppressed as shown in FIG. 7E.

Figure 7F:
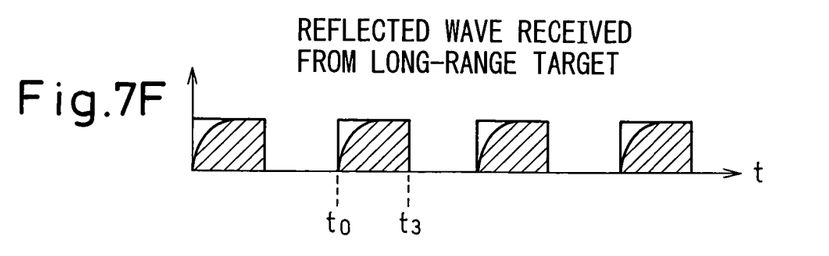

FIG. 7F is a diagram showing the reflected wave received when the target is at long range. In this case, as the return timing of the reflected wave substantially coincides with the receive timing interval $t_0$ to $t_3$, most of the reflected wave is received. In the case of the reflected wave from a long-range target, the received power is small but, while the power of the received wave is suppressed gradually from the leading edge toward the midpoint as shown in FIG. 7F, the overall power of the received wave does not suffer much attenuation because the power is not suppressed in the portion from the midpoint toward the trailing edge.

In this way, according to the present invention, the shorter the target range, the more the power of the received reflected wave is suppressed; as a result, the dynamic range required of the receiver circuit can be reduced.

Figure 8:
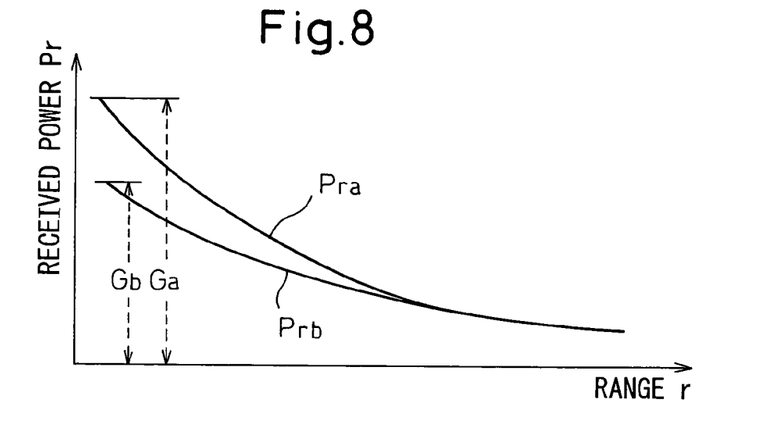
FIG. 8 is a diagram showing the effect of suppressing the gain of a receiver amplifier in the first half portion of a receive timing interval.

FIG. 8 is a diagram showing the effect of suppressing the gain of the receiver amplifier Ar in the first half portion of the receive timing interval. In the figure, the horizontal axis represents the range r to the target, and the vertical axis the received power Pr. The received power can be expressed by the previously given equation (3), and decays with the fourth power of the range r as shown by the curve Pra. However, as can be seen from the curve Pra, the received power at the antenna is large at short range, and a dynamic range as large as Ga is required if the received power not only from short range but also from long range is to be handled.

On the other hand, the curve Prb shows the variation of the received power as a function of the range when the gain of the receiver amplifier Ar is suppressed. As shown by the curve Prb, as the gain of the reflected wave from the short range is suppressed by the receiver amplifier Ar, the received power at the antenna for the short-range region is reduced, and the required dynamic range is thus reduced to Gb which is smaller than Ga.

When the gain of the reflected wave from a short range is suppressed, the received power of the reflected wave from a short-range target (the output of the amplifier Ar) decreases as shown by the curve Prb, but the received power of the reflected wave from a mid-range or long-range target is substantially the same as when the gain is not suppressed. Accordingly, signals ranging from short range to long range can be handled with a small dynamic range.

In the above description, the received power is suppressed by controlling the gain of the receiver amplifier Ar but, alternatively, the received power may be suppressed by controlling the gain of the transmitter amplifier At and suppressing the transmitting power in the second half portion of the transmit wave transmit timing interval. In the latter case, the amount of suppression is reduced gradually or stepwise from the trailing edge toward the midpoint of the transmit timing interval. In other words, the amount of suppression is increased gradually or stepwise from the midpoint toward the trailing edge of the transmit timing interval.

Figure 9A:
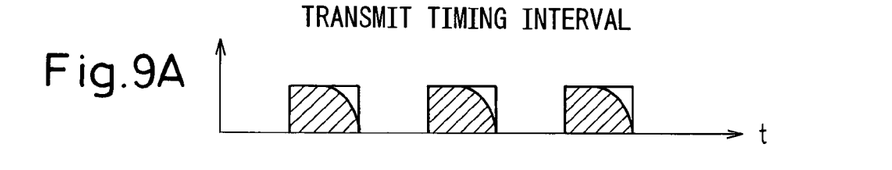
FIGS. 9A, 9B, 9C, and 9D are diagrams for explaining the operation of the embodiment of the present invention.

FIGS. 9A to 9D are diagrams showing the transmit timing interval and the method of suppression for the above case. As shown in FIG. 9A, the amount of suppression is increased gradually from the midpoint toward the trailing edge of the transmit timing interval.

Figure 9B:
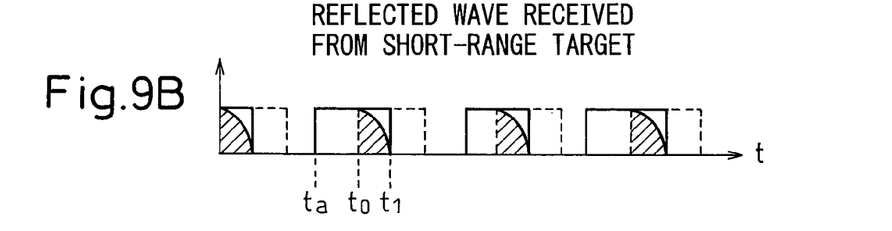
Figure 9C:
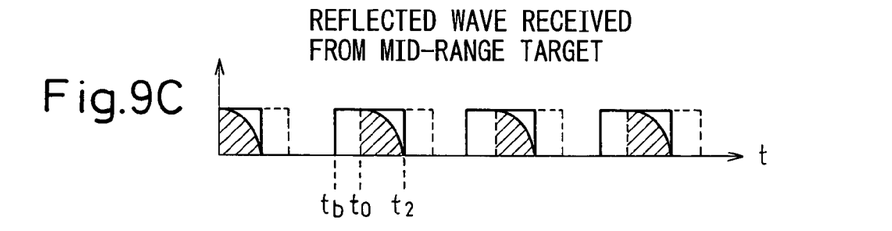
Figure 9D:
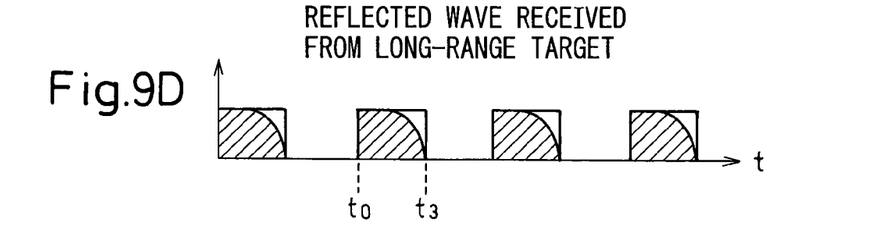

FIGS. 9B to 9D are diagrams showing the reflected waves from short-range, mid-range, and long-range targets, respectively. The reflected waves shown here correspond to the reflected waves shown in FIGS. 7D to 7F, respectively but, as the portion where the power is suppressed is the second half portion, the amount of suppression increases gradually from the midpoint toward the trailing edge, conversely to the case of FIGS. 7D to 7F.

Alternatively, the gains of both the transmitter and receiver amplifiers may be controlled to achieve the same effect. This also applies to the embodiments hereinafter described.

[Embodiment 2]

Figure 10:
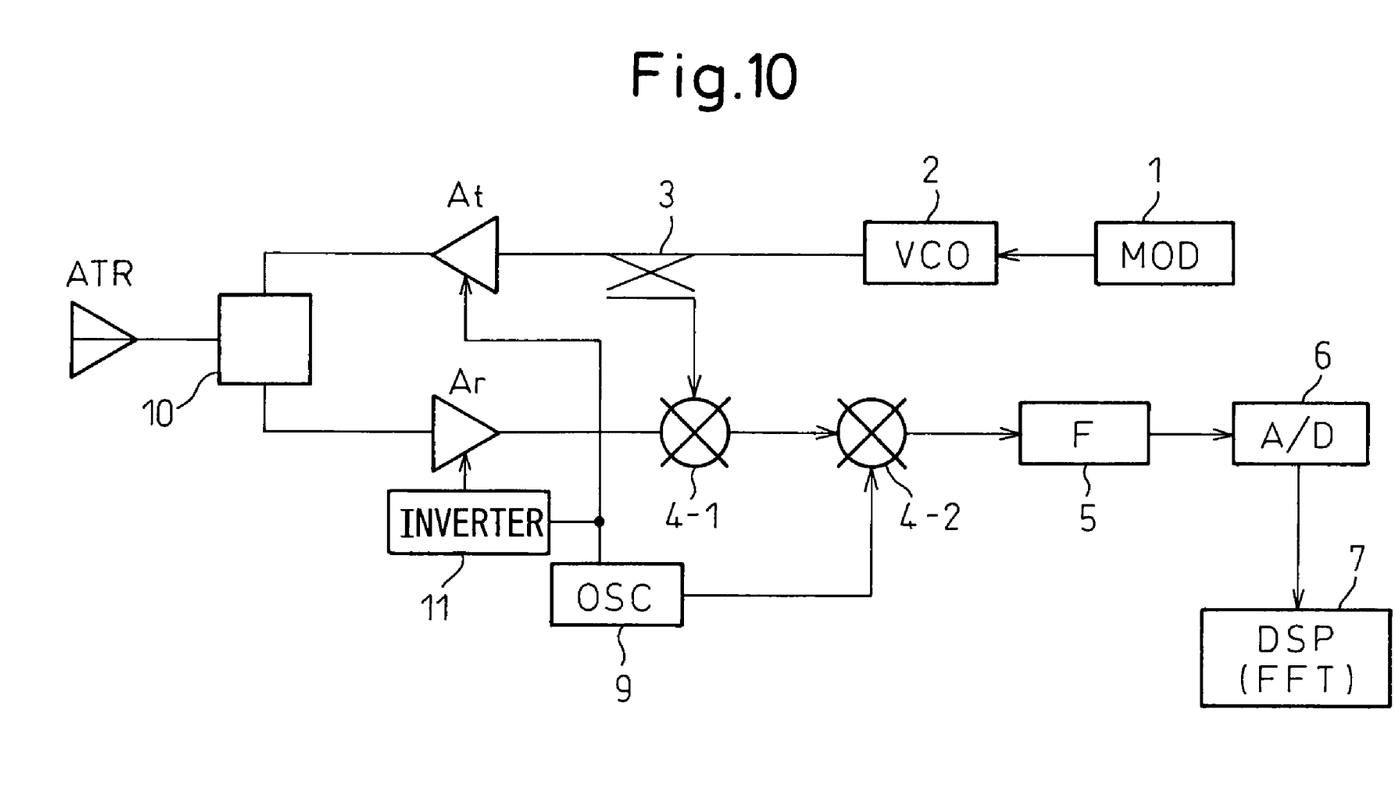
FIG. 10 is a diagram showing another configuration example of the single-antenna transmit-receive FM-CW radar used in the present invention.

FIG. 10 is a diagram schematically showing the configuration of a single-antenna transmit-receive FM-CW radar used in the present invention. A modulating signal generator (MOD) 1 applies a modulating signal to a voltage-controlled oscillator (VCO) 2 for frequency modulation, and the frequency-modulated wave is passed through a directional coupler 3 and transmitted out from a transmitting/receiving antenna (ATR), while a portion of the transmitted signal is separated by the directional coupler 3 and fed into a first mixer 4-1. The signal reflected from a target is received by the transmitting/receiving antenna (ART). Reference numeral 10 indicates a transmit-receive duplexer. "At" designates an amplifier provided in the transmitter, and "Ar" an amplifier provided in the receiver; the on/off operations of the amplifiers are controlled by a switching signal of frequency $f_{SW}$ supplied from a transmit-receive switching signal generator (OSC) 9 constructed from an oscillator. The receiver amplifier Ar is provided with an inverter so that the amplifiers At and Ar are alternately turned on and off; that is, transmission is performed when the amplifier At is on, and reception is performed when the amplifier Ar is on.

The received signal is mixed in the first mixer 4-1 with the output signal of the voltage-controlled oscillator (VCO) 2 to produce an IF signal. The IF signal is mixed in a second mixer 4-2 with the modulating signal of frequency $f_{SW}$ supplied from the OSC 9 and is thus downconverted, producing a beat signal. The beat signal is passed through a filter (F) 5, and is converted by an A/D converter (A/D) 6 into a digital signal; the digital signal is then supplied to a digital signal processor (DSP) 7 where signal processing, such as a fast Fourier transform, is applied to the digital signal to obtain distance, relative velocity, etc.

The operation described with reference to FIGS. 7A to 7F and FIGS. 9A to 9D is also performed in the single-antenna transmit-receive FM-CW radar shown in FIG. 10.

[Embodiment 3]

Figure 11A:
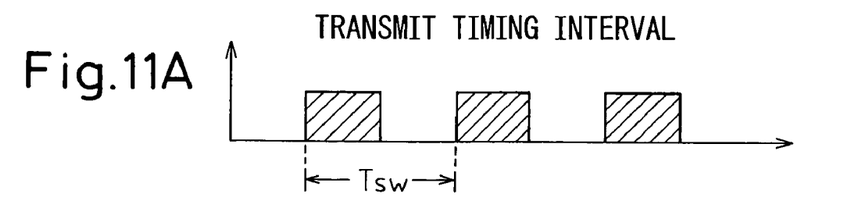
FIGS. 11A, 11B, 11C, and 11D are diagrams for explaining an alternative embodiment of the present invention.
Figure 11B:
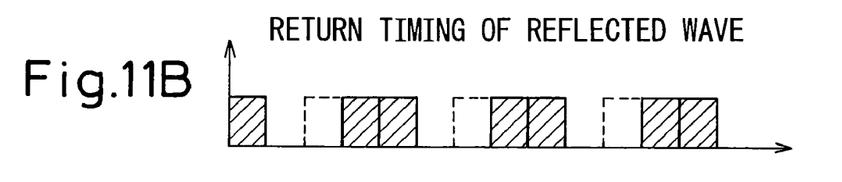
Figure 11C:
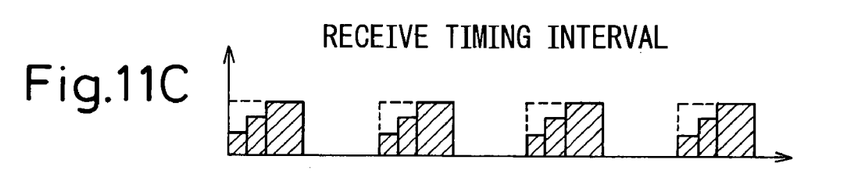

FIGS. 11A to 11D are diagrams for explaining the operation of another embodiment of the present invention. FIG. 11A shows the transmit timing internal, and FIG. 11B shows the return timing of the reflected wave which is received with a finite time delay from the transmit timing. FIG. 11C shows the receive timing interval; here, the receiver amplifier Ar in FIG. 10 is controlled as in the case of the first embodiment. In the present embodiment, the amount of suppression is varied stepwise in the first half portion of the receive timing interval in such a manner that the gain returns to the normal level, for example, at the midpoint of the interval.

Figure 11D:
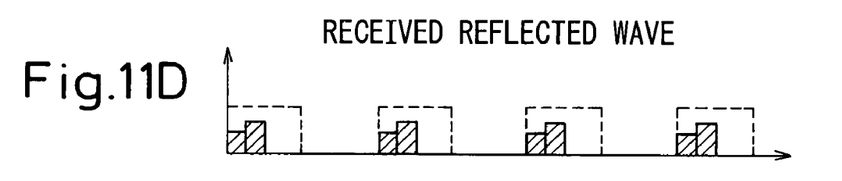

FIG. 11D shows a waveform corresponding to that shown in FIG. 7D, that is, the reflected wave received when the target is at a short range. In this case, as the target is at a short range, the reflected wave is received in the first half portion of the receive timing, but not received in the second half portion. In this embodiment, as the amount of gain suppression of the receiver amplifier Ar is varied stepwise from the leading edge toward the midpoint of the receive timing interval, the dynamic range of the reflected wave returned from the short-range target can be reduced.

Figure 12A:
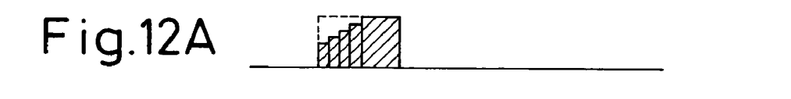
FIGS. 12A and 12B are diagrams for explaining a modification of the alternative embodiment of the present invention.
Figure 12B:
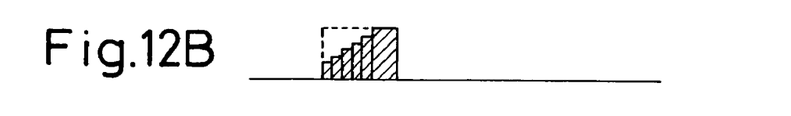

FIGS. 12A and 12B are diagrams each showing a modification of the third embodiment; here, the amount of gain suppression of the receiver amplifier Ar is varied in a number of steps as in the third embodiment, but the number of steps is increased. Increasing the number of steps has the effect of allowing fine control of the amount of gain suppression.

[Embodiment 4]

Figure 13:
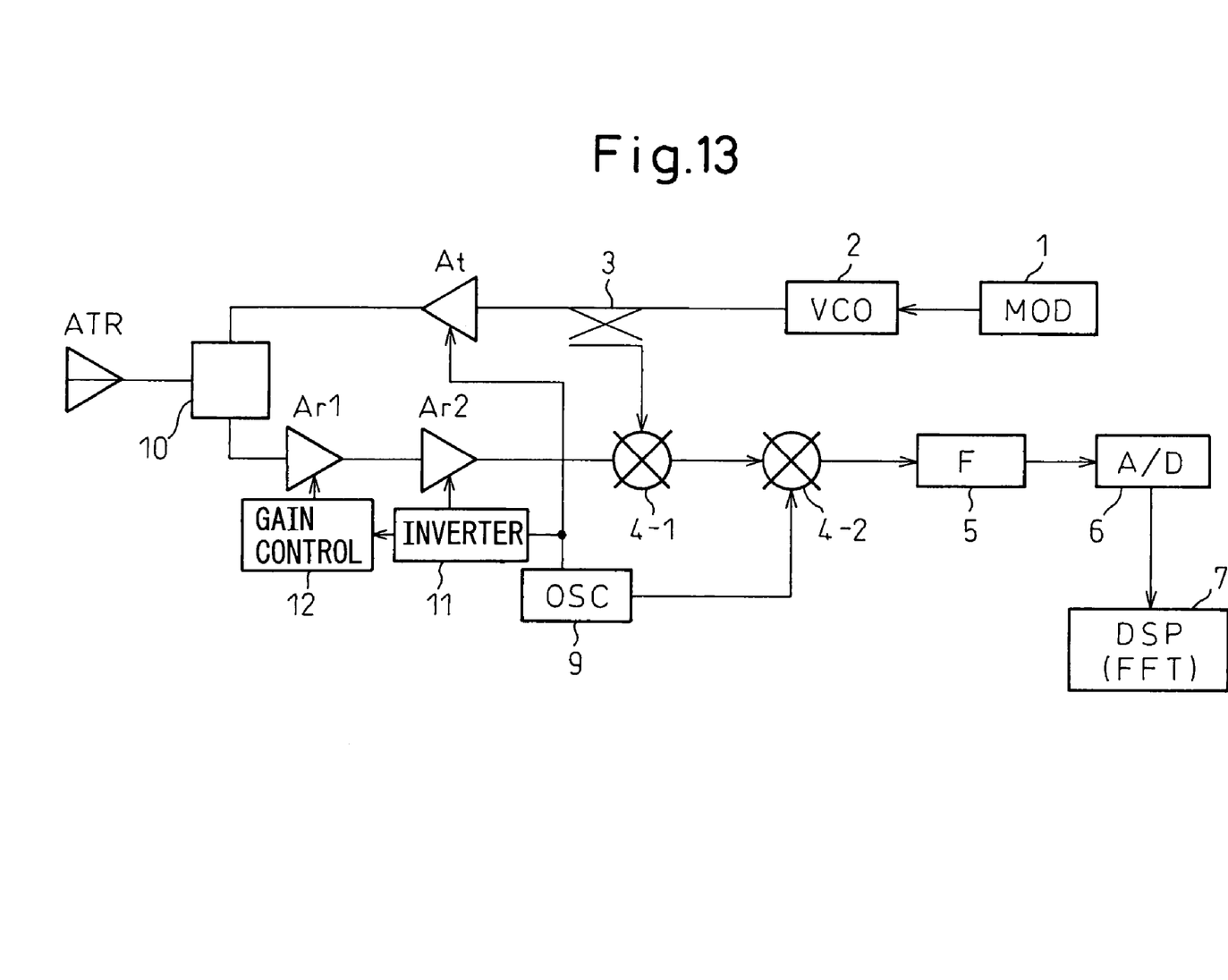
FIG. 13 is a diagram showing another configuration example of the single-antenna transmit-receive FM-CW radar used in the present invention.

FIG. 13 is a diagram showing still another embodiment of a single-antenna transmit-receive FM-CW radar according to the present invention. The single-antenna transmit-receive FM-CW radar shown in FIG. 13 differs from the configuration shown in FIG. 10 in that a plurality of receiver amplifiers, for example, two receiver amplifiers Ar1 and Ar2, are provided, one amplifier Ar1 being provided with a gain control means 12 for controlling the gain and the other amplifier Ar2 provided with a means for performing switching between transmission and reception.

In the single-antenna transmit-receive FM-CW radar shown in FIG. 13, the gain is controlled in the receiver amplifier Ar1 but, instead, the gain may be controlled in the other receiver amplifier Ar2. Alternatively, the received power may be suppressed by controlling the gain of the transmit wave in the transmitter amplifier At in such a manner as to suppress the gain in the second half portion of the transmit wave transmit timing interval.

[Embodiment 5]

Figure 14:
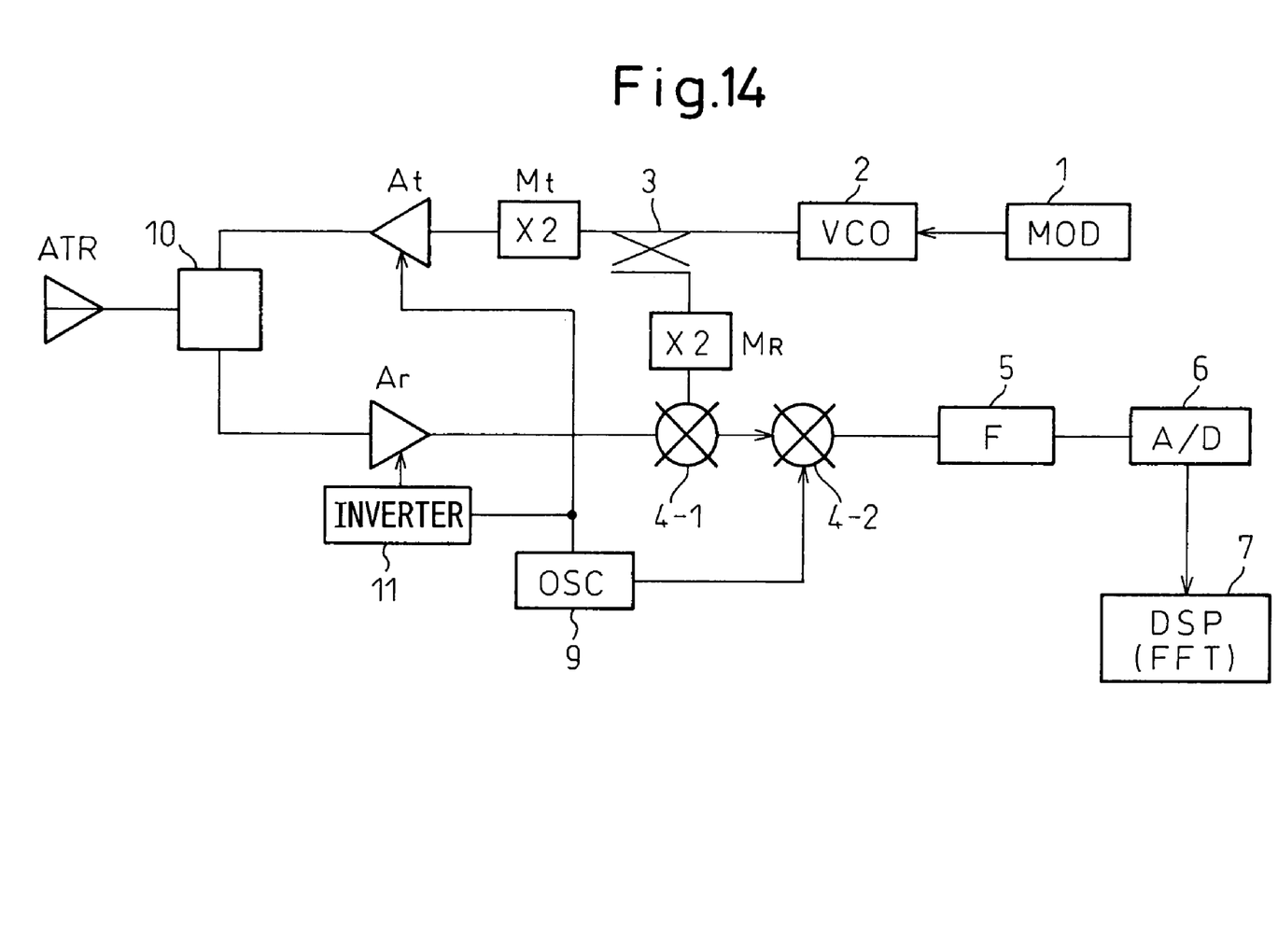
FIG. 14 is a diagram showing another configuration example of the single-antenna transmit-receive FM-CW radar used in the present invention.

FIG. 14 is a diagram showing yet another embodiment of a single-antenna transmit-receive FM-CW radar according to the present invention. The single-antenna transmit-receive FM-CW radar shown in FIG. 14 differs from the configuration shown in FIG. 10 in that multipliers Mt and Mr, respectively, are provided in the transmitter signal path and/or the branch section branching off the directional coupler in the transmitter.

In this embodiment, the power of the transmit wave in the second half of the transmit timing interval is suppressed and is modulated by varying the voltage applied to the multiplier (Mt) provided in the transmitter signal path. Alternatively, the power in the first half of the transmit timing interval may be suppressed and modulated by varying the voltage applied to the multiplier (Mr) provided in the branch section. In this way, the received power can be suppressed.

[Embodiment 6]

Figure 15:
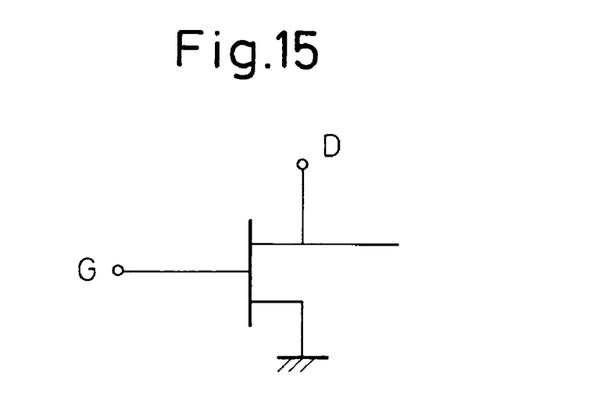
FIG. 15 is a diagram showing the configuration of an amplifier A.

FIG. 15 is a diagram showing the configuration of an amplifier A. A signal is input to a gate G and output from a drain D.

Figure 16A:
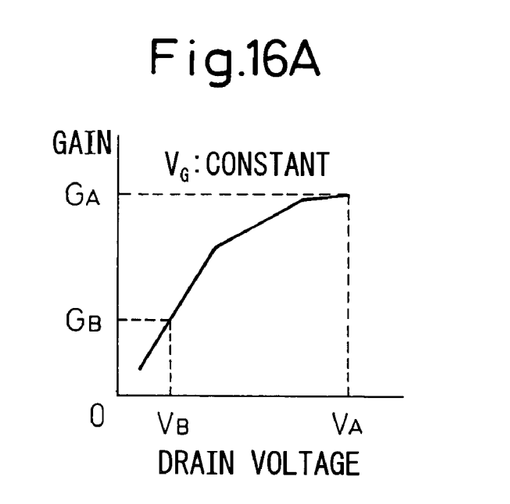
FIGS. 16A and 16B are graphs showing how the gain of the amplifier A changes when a drain voltage or a gate voltage is varied.
Figure 16B:
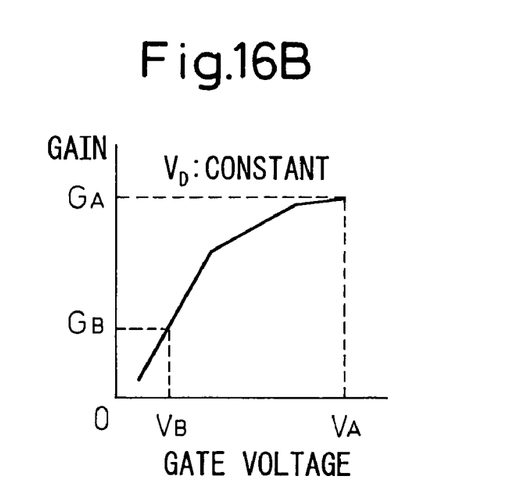

FIGS. 16A and 16B are graphs showing how the gain of the amplifier A changes when the bias voltage to the drain D or gate G is varied. FIG. 16A shows the change in gain when the drain bias voltage is varied from VB to VA while holding the gate voltage VG constant. When the bias voltage VB is applied, the gain is as low as GB; at this time, the amplifier A is almost inoperative and is thus essentially off. On the other hand, when the bias voltage VA is applied, the gain is as high as GA; at this time, the amplifier A is in the operating state.

When controlling the gain of the amplifier to suppress the gain in the first half of the receive timing interval or the second half portion of the transmit timing interval, as in the present invention, the drain voltage is gradually varied from VB to VA. When suppressing the gain in a stepwise manner, the drain voltage is varied from VB to VA in a stepwise manner.

FIG. 16B shows the change in gain when the gate bias voltage is varied from VB to VA while holding the drain voltage VD constant. When the bias voltage VB is applied, the gain is as low as GB; at this time, the amplifier A is almost inoperative and is thus, essentially, off. On the other hand, when the bias voltage VA is applied, the gain is as high as GA; at this time, the amplifier A is in the operating state.

When controlling the gain of the amplifier to suppress the gain in the first half of the receive timing interval or the second half portion of the transmit timing interval, as in the present invention, the gate voltage is gradually varied from VB to VA. When suppressing the gain in a stepwise manner, the gate voltage is varied from VB to VA in a stepwise manner.

What is claimed is:

1. A transmit-receive FM-CW radar apparatus which switches between transmission and reception by time division control, wherein an amplifier capable of gain control is provided in a transmitter signal path or a receiver signal path, and wherein when said amplifier is provided in said receiver signal path, said amplifier is controlled so as to suppress said gain in a first half of a receive timing interval, while when said amplifier is provided in said transmitter signal path, said amplifier is controlled so as to suppress said gain in a second half of a transmit timing interval.

2. A transmit-receive FM-CW radar apparatus as claimed in claim 1, wherein amplifiers are provided in said transmitter signal path and said receiver signal path, respectively, and said switching between transmission and reception is performed by operating said amplifier provided in said transmitter signal path and said amplifier provided in said receiver signal path in alternating fashion in synchronism with said transmit and receive timings.

3. A transmit-receive FM-CW radar apparatus as claimed in claim 1, wherein the suppression of said gain is performed in such a manner as to reduce the amount of said suppression gradually from a leading edge toward a midpoint of said receive timing interval or from a trailing edge toward a midpoint of said transmit timing interval.

4. A transmit-receive FM-CW radar apparatus as claimed in claim 2, wherein the suppression of said gain is performed in such a manner as to reduce the amount of said suppression gradually from a leading edge toward a midpoint of said receive timing interval or from a trailing edge toward a midpoint of said transmit timing interval.

5. A transmit-receive FM-CW radar apparatus as claimed in claim 1, wherein the suppression of said gain is performed in such a manner as to reduce the amount of said suppression stepwise from a leading edge toward a midpoint of said receive timing interval or from a trailing edge toward a midpoint of said transmit timing interval.

6. A transmit-receive FM-CW radar apparatus as claimed in claim 2, wherein the suppression of said gain is performed in such a manner as to reduce the amount of said suppression stepwise from a leading edge toward a midpoint of said receive timing interval or from a trailing edge toward a midpoint of said transmit timing interval.

7. A transmit-receive FM-CW radar apparatus as claimed in claim 2, wherein a plurality of amplifiers are provided in said receiver signal path, wherein one of said amplifiers is provided with a means for accomplishing said switching between transmission and reception, while the other one of said amplifiers is provided with a means for suppressing said gain in the first half of said receive timing interval.

8. A transmit-receive FM-CW radar apparatus as claimed in claim 1, wherein the suppression of said gain by said amplifier is performed by varying a voltage applied to said amplifier.

9. A transmit-receive FM-CW radar apparatus as claimed in claim 2, wherein said switching between transmission and reception by said amplifiers is performed by varying voltages applied to said amplifiers.

10. A transmit-receive FM-CW radar apparatus which switches between transmission and reception by time division control, wherein an amplifier capable of controlling gain is provided in a transmitter signal path or a receiver signal path, and a multiplier capable of controlling power is provided in said transmitter signal path or in a branch section branching off a directional coupler in said transmitter signal path, and wherein a voltage applied to said multiplier (Mt) provided in said transmitter signal path is varied so as to suppress power in a second half of a transmit timing interval, while a voltage applied to said multiplier (Mr) provided in said branch section is varied so as to suppress power in a first half of a receive timing interval.

\* \* \* \* \*